United States Patent [19]

Schafer

[11] Patent Number: 4,991,389
[45] Date of Patent: Feb. 12, 1991

[54] BLEED MODULATION FOR TRANSIENT ENGINE OPERATION

[75] Inventor: Bradley C. Schafer, Manchester, Conn.

[73] Assignee: United Technologies Corporation, Hartford, Conn.

[21] Appl. No.: 342,001

[22] Filed: Apr. 21, 1989

[51] Int. Cl.[5] .............................................. F02C 9/52
[52] U.S. Cl. .................................................. 60/39.29
[58] Field of Search ........................... 60/39.27, 39.29; 415/26, 27, 28

[56] References Cited

U.S. PATENT DOCUMENTS

| | | | |
|---|---|---|---|
| 3,688,504 | 9/1972 | Hutchinson et al. | 60/39.29 |
| 4,102,595 | 7/1978 | Wibbelsman | 415/28 |
| 4,117,688 | 10/1978 | Elsaessen et al. | 60/39.29 |
| 4,655,034 | 4/1987 | Kenison et al. | 60/39.29 |
| 4,756,152 | 7/1988 | Krukoski et al. | 60/39.02 |

Primary Examiner—Louis J. Casaregola

[57] ABSTRACT

A gas turbine engine control system modulates a compressor bleed valve between full open and full closed during transient engine operation as a function of the rate of change of compressor speed biased by flight conditions, such as altitude, and corrected for engine power level. A hysteresis construct may be applied to the rate of change of compressor speed before such rate is used to determine the new bleed valve position.

5 Claims, 2 Drawing Sheets

BLEED MODULATION FOR TRANSIENT ENGINE OPERATION

DESCRIPTION

1. Technical Field

This invention relates to gas turbine engines and particularly to a means and method for controlling compressor bleed valves during transient engine operation.

2. Background Art

As is well-known in the art, it is necessary to operate gas turbine engines close to the engine's surge line in order to transition from one steady-state mode of operation to another as quickly as possible. Excursions beyond the surge line cannot be tolerated inasmuch as surge can result in sudden thrust loss and/or engine over-temperature. Typically, engine controls monitor various engine parameters and include schedules of engine parameters which are used to automatically control the engine, accounting for the surge characteristics of the particular engine (with an adequate safety factor) for which the control is designed.

During steady-state engine operation, it is known to modulate the compressor bleed valve in accordance with a particular schedule based on such parameters as altitude, Mach number and engine power level. During transient engine operation the steady-state bleed valve position is reset more open by an amount which is a function of the ratio of actual rate of speed change of the compressor to a maximum scheduled rate of speed change of the compressor, biased to account for engine speed (i.e., power level). The closer the actual rate of change is to the scheduled maximum rate of change, the more the bleed is opened. Such a system is shown and described in commonly owned U.S. Pat. No. 4,756,152 by Leon Krukoski and Nicola Laudadio.

The closer the compressor operating line is to the stall line, the better the engine performance. Ideally, it is desired to maintain the compressor pressure ratio at an approximately constant safe distance below the stall line over the entire operating range of the engine. When an engine decelerates, the compressor pressure ratio increases if the bleed open area remains unchanged. This reduces the stall margin. The function generator of U.S. Pat. No. 4,756,152 generates a request to open the bleed valve to reduce the pressure ratio to at least partially compensate for the increase in pressure ratio resulting from such an engine deceleration. That request is partially dependent on a schedule of maximum rate of change of compressor speed built into the control system; however, engine requirements which dictate the schedule of maximum rate of change of compressor speed are often different from the compressor bleed requirements. Tying the compressor bleed requirements to the schedule of maximum rate of change of compressor speed is a constraint which prevents the control system designer or engineer from scheduling the bleed as fully closed as safety margins would otherwise allow. Put another way, the prior art control system does not yield a transient compressor operating curve with a consistently small allowable surge margin despite the fact that such a system is an improvement over the bleed open/bleed closed system which preceded it.

When the bleed open area is increased, the engine undergoes a thermodynamic rematch resulting in a reduction of the deceleration rate, even though the pilot's actions are not calling for such a reduction. This undesired reduction in deceleration rate causes the control system to call for a decrease (or less of an increase) in the bleed open area. Bleed position changes also result in engine pressure ratio (EPR) changes. Since fuel flow is usually tied to EPR, a bleed position change may cause a small flow rate change. These phenomenon, hereinafter referred to as "bleed system interactions", cause undesirable bleed valve and thrust oscillations during transition from one steady-state postion to another.

In the prior art, tying the bleed schedule to the schedule of maximum rate of change of compressor speed, coupled with the requirement to avoid the above discussed oscillations, forced the control system to be designed with a greater than desirable stability threat during initial stages of a sudden deceleration. It is that threat and the undesired thrust oscillations which it is now desired to reduce or eliminate.

DISCLOSURE OF INVENTION

One object of the present invention is a compressor bleed control system for a gas turbine engine which allows the compressor to operate closer to the stall line during engine transients without sacrificing safety.

Another object of the present invention is a bleed control system which permits the compressor to operate with a relatively constant surge margin throughout transient operation.

A further object of the invention is a bleed control system which permits the compressor to operate close to its steady-state operating line throughout an engine transient.

Yet another object of the present invention is a bleed control system which avoids oscillations of the bleed open area during transient engine operation as the engine passes from one steady-state operating mode to another steady-state operating mode.

According to the present invention, during an engine transient a control system modulates a compressor bleed valve between full open and full closed positions as a function of rate of change of compressor speed biased by flight condition and corrected for engine power level. More specifically, to maintain a consistently small, but allowable compressor surge margin during transient engine operation, an additional percentage of full open bleed area for transient operation is determined by a function generator based upon the rate of change in engine speed, biased for flight condition. A correction factor is applied to that percent to account for engine power level. The corrected percentage is added to the scheduled steady-state percentage of bleed open area, and the combined amount is used to reset the bleed open area. The bleed schedule of the function generator is independent of any scheduled maximum allowable rate of change of engine speed.

The present invention is particularly suited for use during a deceleration of an engine having a high and low pressure compressor. Deceleration of the high compressor causes an increase in the pressure ratio across the low compressor, which tends to move the operating line of the low compressor closer to its stall line, thereby reducing the safety margin. Increasing the bleed open area compensates for this occurrence by reducing the pressure ratio across the low pressure compressor, thereby moving its operating line further away from the stall line. There is a linear relationship between the deceleration rate and the amount of movement of the operating line toward the stall line. This linear relationship varies with the flight condition at which the engine is operating. In the control system of the present invention a function generator produces a signal which is indicative of the amount that the bleed must be opened to compensate for both the deceleration rate and the flight condition. (Altitude, for example, may be used as the indicia of flight condition.) A reduction in the movement of the compressor operating line toward the stall line is thereby achieved.

The bleed flow rate is a function of both the bleed open area and the relative gas pressures at the bleed inlet and exit. The bleed inlet gas pressure varies with engine power level. Therefore, to control the stall margin during a deceleration, it is also necessary to compensate for changes in power level. In the control system of the present invention, the scheduled amount of change in the bleed open area for a particular deceleration rate and flight condition is multiplied by an engine power dependent correction factor. It is that product which is ultimately used to reset the bleed open area during a deceleration. Preferably the bleed schedules and power level correction factors are selected to control the bleed open area so as to maintain the low pressure compressor transient operating line at a constant small percentage below the steady-state operating line. This maintains the stall margin close to the minimum safe level throughout the deceleration.

In accordance with a preferred embodiment of the present invention, a hysteresis construct is applied to the deceleration rate signal before that signal is input to the function generator and used to generate a new bleed position signal. A hysteresis construct is a function which holds the output of a signal constant until the difference between the output and the input exceed one half of a specified value called the bandwidth. When the input is greater than the output plus one half the bandwidth, the output is set equal to the input minus one half the bandwidth. When the input is less than the output minus one half the bandwidth, the output is set equal to the input plus one half the bandwidth. Otherwise the output remains constant. The bandwidth is selected such that variations in the input due to noise and bleed system interactions will have minimal influence on the output.

With respect to the present invention, when the pilot retards the throttle to decelerate the engine, fuel flow is immediately reduced and the compressor begins to decelerate. Without applying a hysteresis construct to the deceleration rate, the control system would simply set the bleed flow rate based upon the actual deceleration rate at that moment. Thus, as the deceleration rate increases due to pilot demand, the bleed open area would be increased to reduce the pressure ratio across the compressor. The resultant bleed flow would cause a thermodynamic rematch of the engine; this rematch would produce a slight decrease in the deceleration rate. The response of the control system to the decrease in deceleration rate would be two fold. It would cause the bleed control to decrease the bleed open area, while the fuel control further reduces fuel flow to maintain a desired acceleration rate. The net result, without hysteresis, would be engine thrust oscillations. By applying a hysteresis construct to the deceleration rate, small fluctuations (less than the selected bandwidth) in the deceleration rate will not result in a change in the magnitude of the deceleration rate signal sent to the function generator. Effectively the hysteresis construct causes the bleed flow response to lag a change in the deceleration rate by the selected bandwidth, thereby reducing the potential for bleed flow oscillations (and thus thrust oscillations) during a deceleration.

BEST MODE FOR CARRYING OUT THE INVENTION

Figure 1:
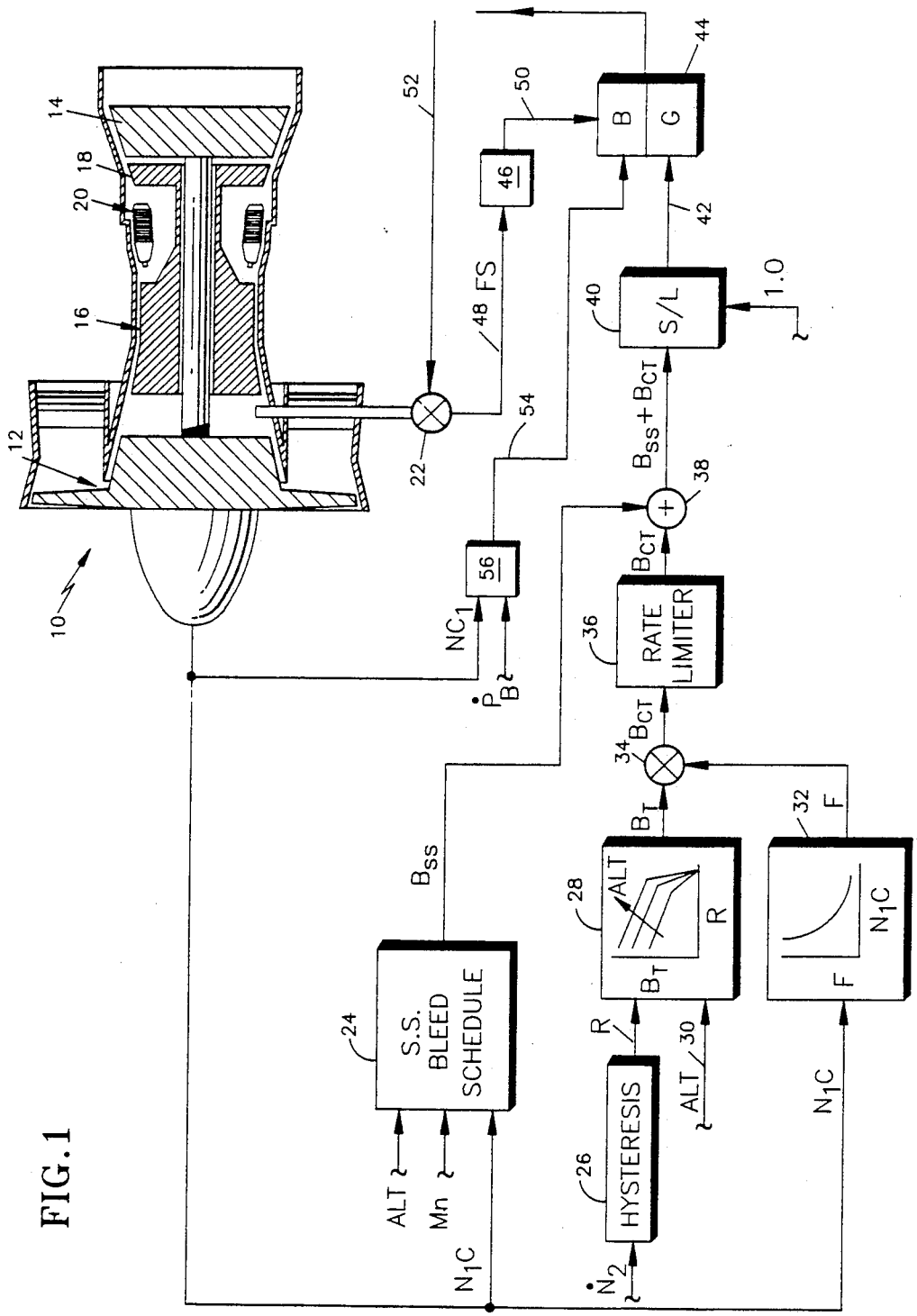
FIG. 1 is a schematic and block diagram of a twin spool gas turbine engine incorporating the control system of the present invention.

As an exemplary embodiment of the present invention, consider the twin spool turbofan gas turbine engine shown in the drawing and generally represented by the reference numeral 10. The engine comprises a low pressure compressor 12 connected through a shaft to a low pressure turbine 14; a high pressure compressor 16 connected through a shaft to a high pressure turbine 18; and a burner section 20 disposed between the high compressor and high turbine. A bleed valve 22 is disposed between the high and low pressure compressor to dump compressor air from the engine flow path during certain engine operating conditions.

As is well-known in the art, and as is the case in the present embodiment, the bleed valve open area is regulated by an electronic engine control which also regulates, for example, the fuel flow rate into the burner section. Only that portion of the electronic engine control directly related to the control of the bleed valve 22 is shown in the drawing; and it is shown in a simplified manner for purposes of explanation.

Still referring to the drawing, signals indicative of the corrected low rotor speed $N_1C$, the aircraft Mach number (Mn), and aircraft altitude (ALT), are all provided to a function generator 24 which generates a steady-state bleed position signal $B_{SS}$ from and empirically developed steady-state bleed schedule. $B_{SS}$ indicates the desired steady-state position of the bleed valve 22, which may be anywhere from fully closed to 100% open.

The rate of change of high pressure rotor speed ($\dot{N}_2$) is calculated or determined at regular intervals and a hysteresis construct applied thereto, as represented by the block 26 labeled "hysteresis". The output R from the hysteresis 26 is provided to a function generator 28 along with an altitude signal 30 which is representative of the flight condition at which the engine is operating. The function generator is designed to deliver a transient bleed position reset signal $B_T$, which indicates how much more the bleed valve 22 should be opened to cancel the loss of stall margin which would otherwise occur during a deceleration. The output signal $B_T$ is biased within the function generator 28 to account for the flight condition at which the engine is operating, since the flight condition has an effect on the relationship between engine deceleration rate and the required bleed open area. The function generator does not, however, account for differences in the actual bleed flow for a given bleed open area, which differences result from the power level at which the engine is operating. In this embodiment, altitude is the flight condition parameter used to bias the output signal $B_T$. Other parameters, such as ambient pressure, engine Mach number or engine inlet total pressure may also be used.

To account for those differences, a function generator 32 has, as its input, the corrected low pressure compressor speed $N_1C$, which is a parameter indicative of engine power level. The function generator 32 produces a signal F which is herein referred to as a correction factor. The correction factor F and the transient bleed position reset signal $B_T$ are multiplied together in a multiplier 34 whose output $B_{CT}$ is hereinafter referred to as the corrected transient bleed position reset signal. $B_{CT}$ is the additional bleed open area required to minimize the loss of stall margin due to a deceleration.

If the engine power level happens to be the same as the engine power level on which the empirical curves within the function generator 28 are based, then the value of F would be 1.0, and $B_T$ will equal $B_{CT}$. Otherwise, the correction factor F will be greater or less than 1.0, as the case may be. $B_{CT}$ has a value between 0.0 and 1.0 which represents a fraction or percent of the fully opened bleed area. Thus, if $B_{CT}$ equals 0.3 it means that the bleed open area should be increased by an amount equal to 30% of its full open area in order to compensate for the loss of stall margin due to the deceleration.

The corrected transient bleed position reset signal $B_{CT}$ passes through a rate limiter 36 and is added to the steady-state bleed position signal $B_{SS}$ in an adder 38. The combined signals $B_{SS}+B_{CT}$ is passed to a select-low gate 40, which additionally receives a signal having a value of 1.0. The select-low gate output signal 42 will, therefore, never be greater than 1.0, which means that the valve 22 should be fully opened. The output signal 42 is passed to a selector 44. This function will be explained hereinbelow.

A feedback signal FS is sent from the bleed valve 22 to a determinator 46 via a line 48. The determinator 46 sends a signal 50 to the selector 44 only when the feedback signal $F_S$ is either unavailable or unreliable, which means the present position or open area of the bleed valve cannot be reliably determined. If the selector 44 does not receive such a signal, it means the feedback signal FS is good (G) and the selector output signal 52 will have the value of the signal 42, which is the lower of 1.0 or the sum of the steady-state bleed position signal ($B_{SS}$) and the corrected transient bleed position reset signal ($B_{CT}$). The selector output signal 52 is then used to reset the position of the bleed valve. On the other hand, if a signal 50 is sent to the selector 44, it means the feedback signal FS is bad (B) or unreliable. The selector output signal 52 will then be equivalent to the output signal 54 from a calculator 56.)

The calculator 56 receives signals indicative of the low pressure compressor speed $NC_1$ and the rate of change of the burner pressure $\dot{P}_B$. Based upon those two inputs, the calculator 56 determines whether the bleed valve is best fully opened or fully closed. Thus, the signal 54 will be either 0.0, which means that the bleed valve should be fully closed, or 1.0 which means that the bleed valve should be fully opened. When the feedback position signal 48 is reliable, then the bleed will be positioned in accordance with the steady-state bleed signal $B_{SS}$ plus and incremental amounts indicated by $B_{CT}$. Such incremental amount will be 0.0 (i.e., $B_T=0.0$) for all negative values of R, which means the engine is accelerating rather than decelerating.

As the rate of deceleration slows and in situations where the pilot suddenly calls for an acceleration in the midst of a deceleration, the value of the corrected transient bleed position signal $B_{CT}$ will be quickly reduced from previous values. If $B_{CT}$ is reduced or removed too suddenly, engine stability might not be maintained. The rate limiter 36 is provided to control or limit the rate at which a reduction in the value of $B_{CT}$ is applied to the adder 38. This prevents the bleed valve from closing too rapidly under certain conditions.

Figure 2:
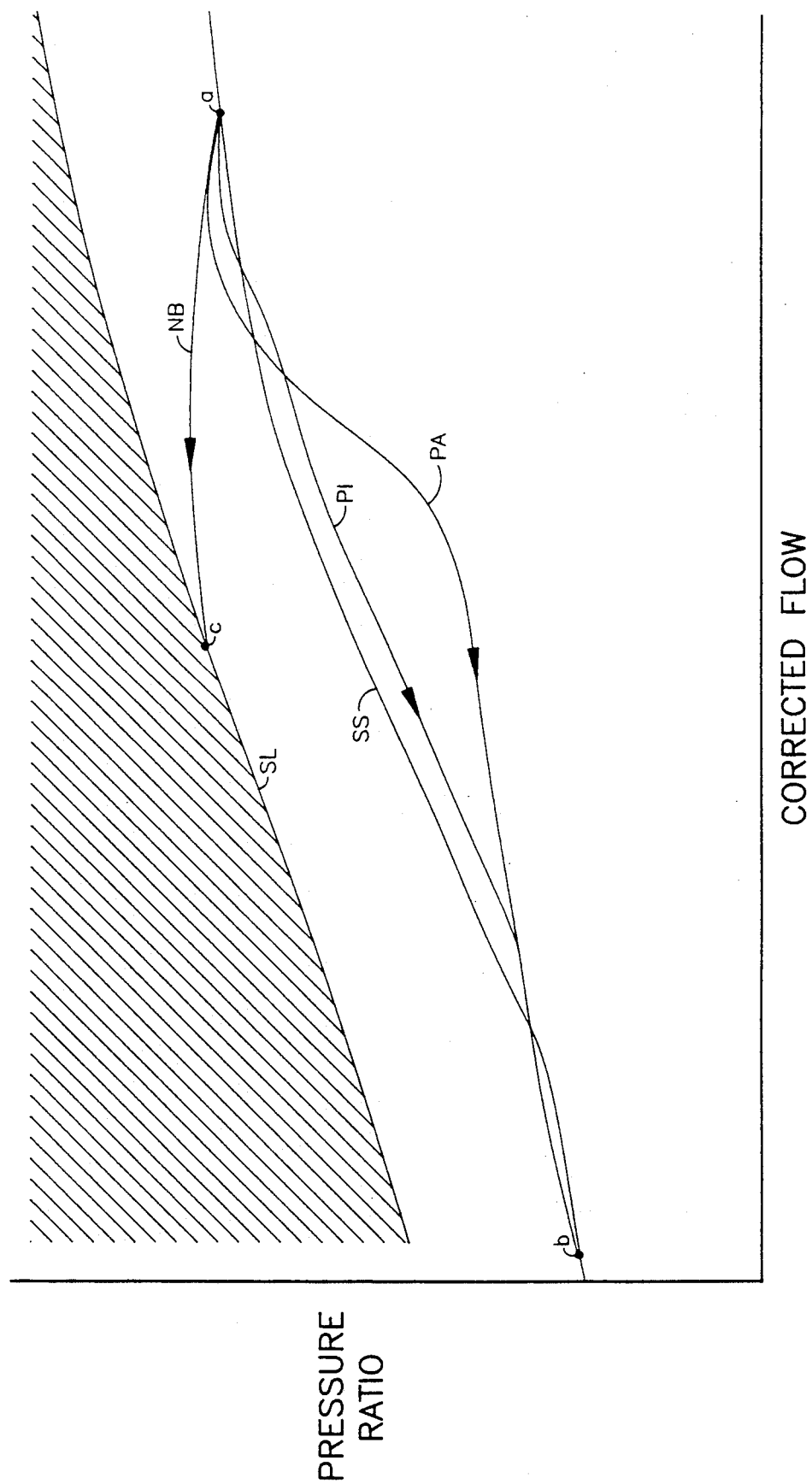
FIG. 2 is a graph of typical compressor response which illustrates the advantages of the present invention over the prior art.

FIG. 2 is a graph illustrating the deceleration response of the low pressure compressor of an engine similar to the type shown in FIG. 1. The pressure ratio across the low pressure compressor is plotted on the vertical axis and corrected flow rate through the compressor is plotted on the horizontal axis. Shown on the graph is the compressor stall line, labeled SL and the steady-state operating line labeled SS. Stall occurs within the cross-hatched area. Note that the stall margin (i.e., the vertical distance between the stall line and the steady-state operating line) is fairly constant for all steady-state operating modes. The characteristics of the transient operating lines have been exaggerated to clearly illustrate several features. The graph is not to scale.

Assume that at the beginning of a deceleration the engine is operating at steady-state position "a" and the pilot suddenly moves the throttle to decelerate the engine to steady-state position "b". If there were no bleed, the transient operating line would follow the line labeled NB in the graph, where engine surge or stall occurs when the stall line is encountered at point "c", as is shown. The curve labeled PA is illustrative of the transient operating line that would be followed by a compressor in an engine having the control system of the prior art shown in U.S. Pat. No. 4,756,152. For a typical snap, (i.e. sudden) deceleration the excursion which is the difference between the steady-state and transient operating lines, initially grows at approximately 15% per second. The growth of this excursion is stopped and reversed as soon as the bleed begins to open. Due to limitations of the prior art control system, the bleed is not opened as quickly as desirable. During the middle phases of the transient, more bleed is used than is actually required.

The operating line which results during a deceleration utilizing the control system of the present invention is labeled PI. The control system of the present invention may be tuned such that the transient operating line PI falls where desired during a major portion of the deceleration mode. As illustrated in FIG. 2, it closely tracks and remains essentially parallel to the steady-state operating line after its initial excursion at the beginning of the deceleration mode. Preferably, it is about 5% in pressure ratio below the steady-state operating line over the major portion of the deceleration mode.

The excursion above the steady-state operating line is due to the delay in the opening of the bleed after initiation of the deceleration. One of the factors contributing to this delay is the application of a hysteresis construct to the deceleration rate. The control system of the present invention will not issue a transient bleed reset command until the deceleration rate exceeds the bandwidth of the hysteresis. When this threshold is reached, the bleed will be opened and the growth of the excursion is reversed. The control system of the prior art must exceed a threshold which is usually greater than the threshold of the present invention.

In a single-spool engine the problem of smooth transition from steady-state position to another typically occurs during accelerations rather than decelerations of the engine. It should be apparent that the present invention could also be used in such an application.

Although this invention has been shown and described with respect to detailed embodiments thereof, it will be understood by those skilled in the art that various changes in form and detail thereof may be made without departing from the spirit and scope of the claimed invention.

I claim:

1. In a gas turbine engine having a compressor and a compressor bleed valve, means for controlling said valve during an engine transient comprising:

function generator means for generating, during the engine transient, a transient bleed reset position signal for use in reducing a shift in the compressor operating line toward the compressor stall line during the transient, the signal having a value which is (1) a function of the rate of change of compressor speed, (2) independent of any schedule of maximum allowable rate of change of compressor speed, and (3) biased by a parameter indicative of the flight condition at which the engine is operating;

means for generating a correction factor for the transient bleed reset position signal dependent upon engine power level;

means for applying the correction factor to the transient bleed reset position signal to produce a corrected transient bleed reset position signal;

means for producing a steady-state bleed position signal appropriate for steady-state engine operation;

means for adding said steady-state bleed position signal to said corrected transient bleed position signal to produce a combined signal; and means responsive to said combined signal for modulating, as a function of the value of said combined signal, the position of said bleed valve during the engine transient.

2. In a gas turbine multi-spool engine having a high pressure compressor, a low pressure compressor, and a compressor bleed valve, means for controlling said bleed valve during engine deceleration comprising:

means for generating a first signal indicative of the rate of change of the speed of a first one of said compressors;

hysteresis means having a second signal as an output and having said first signal as an input;

means for producing a third signal indicative of the power level of said engine;

function generator means responsive to said second signal for generating, during engine deceleration, a transient bleed adjustment signal biased by a parameter indicative of flight condition;

means responsive to said third signal for generating a transient bleed adjustment correction factor which is a function of engine power level;

means for applying said correction factor to the transient bleed adjustment signal to produce a corrected transient bleed adjustment signal;

means for producing a steady-state bleed position signal appropriate for steady-state engine operation;

means for adding said corrected transient bleed adjustment signal to said steady-state bleed position signal to produce a combined signal; and means responsive to said combined signal for modulating, as a function of the value of said combined signal, the position of said bleed valve during engine deceleration.

3. The bleed valve control means according to claim 2 wherein said means indicative of engine power level is the speed of one of said compressors.

4. The bleed valve control means according to claim 3 wherein said bleed valve is a low pressure compressor exit bleed valve, and said first signal is indicative of the rate of change of high pressure compressor speed and said third signal is indicative of low pressure compressor speed.

5. The bleed valve control means according to claim 2 wherein the parameter indicative of flight condition is altitude.

* * * * *

UNITED STATES PATENT AND TRADEMARK OFFICE
CERTIFICATE OF CORRECTION

PATENT NO. : 4,991,389

DATED : February 12, 1991

INVENTOR(S) : Bradley C. Schafer

It is certified that error appears in the above-identified patent and that said Letters Patent is hereby corrected as shown below:

Col. 3, line 61, "acceleration" should read --deceleration--.

Signed and Sealed this

Twenty-second Day of September, 1992

Attest:

DOUGLAS B. COMER

Attesting Officer     Acting Commissioner of Patents and Trademarks